United States Patent

Gupta

(10) Patent No.: US 7,162,279 B2
(45) Date of Patent: Jan. 9, 2007

(54) PORTABLE COMMUNICATION DEVICE HAVING DYNAMIC POWER MANAGEMENT CONTROL AND METHOD THEREFOR

(75) Inventor: Vivek G. Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 10/326,460

(22) Filed: Dec. 20, 2002

(65) Prior Publication Data

US 2004/0121797 A1  Jun. 24, 2004

(51) Int. Cl.
*H04M 1/00* (2006.01)
*H01Q 11/12* (2006.01)

(52) U.S. Cl. .................. 455/574; 455/127.5; 455/522; 713/320; 713/340

(58) Field of Classification Search ............. 455/556.1, 455/556.2, 550.1, 574, 572, 557, 127.5, 522, 455/343.1, 343.2; 370/311, 318; 709/223, 709/229; 713/322–324, 340, 501
See application file for complete search history.

(56) References Cited

U.S. PATENT DOCUMENTS

| 4,689,581 | A | 8/1987 | Talbot |
| 4,890,003 | A | 12/1989 | Seibert et al. |
| 5,021,679 | A | 6/1991 | Fairbanks et al. |
| 5,138,249 | A | 8/1992 | Capel |
| 5,142,684 | A * | 8/1992 | Perry et al. .................. 713/320 |
| 5,153,535 | A | 10/1992 | Fairbanks et al. |
| 5,307,003 | A | 4/1994 | Fairbanks et al. |
| 5,508,653 | A | 4/1996 | Chu et al. |
| 5,515,134 | A | 5/1996 | Taguchi |
| 5,627,412 | A | 5/1997 | Beard |
| 5,703,790 | A * | 12/1997 | Farwell ....................... 700/286 |
| 5,797,089 | A * | 8/1998 | Nguyen ....................... 455/403 |
| 6,088,576 | A * | 7/2000 | Sone .......................... 340/7.33 |
| 6,275,715 | B1 * | 8/2001 | Motohashi ................... 455/574 |
| 6,282,596 | B1 * | 8/2001 | Bealkowski et al. ......... 710/302 |
| 6,351,823 | B1 * | 2/2002 | Mayer et al. ................. 714/10 |
| 6,442,407 | B1 * | 8/2002 | Bauer et al. ................. 455/574 |
| 6,484,041 | B1 * | 11/2002 | Aho et al. .................... 455/574 |
| 6,625,478 | B1 * | 9/2003 | Nonogaki .................... 455/574 |
| 6,711,691 | B1 * | 3/2004 | Howard et al. .............. 713/300 |
| 6,725,060 | B1 * | 4/2004 | Chhatriwala et al. ..... 455/556.2 |
| 6,901,522 | B1 * | 5/2005 | Buch ........................... 713/320 |
| 6,990,594 | B1 * | 1/2006 | Kim ............................ 713/322 |
| 7,024,572 | B1 * | 4/2006 | Oshima et al. .............. 713/323 |

FOREIGN PATENT DOCUMENTS

GB  2 298 499 A *  9/1996

* cited by examiner

*Primary Examiner*—Charles N. Appiah
(74) *Attorney, Agent, or Firm*—Matthew C. Fagan

(57) ABSTRACT

Briefly, in accordance with one embodiment of the invention, a portable communication device includes two processors. A power management controller may be adapted to alter an operational characteristic of the processors. In an alternative embodiment, the power management controller may be further adapted to vary an operational characteristics of one processor while leaving the other processor substantially unchanged.

23 Claims, 1 Drawing Sheet

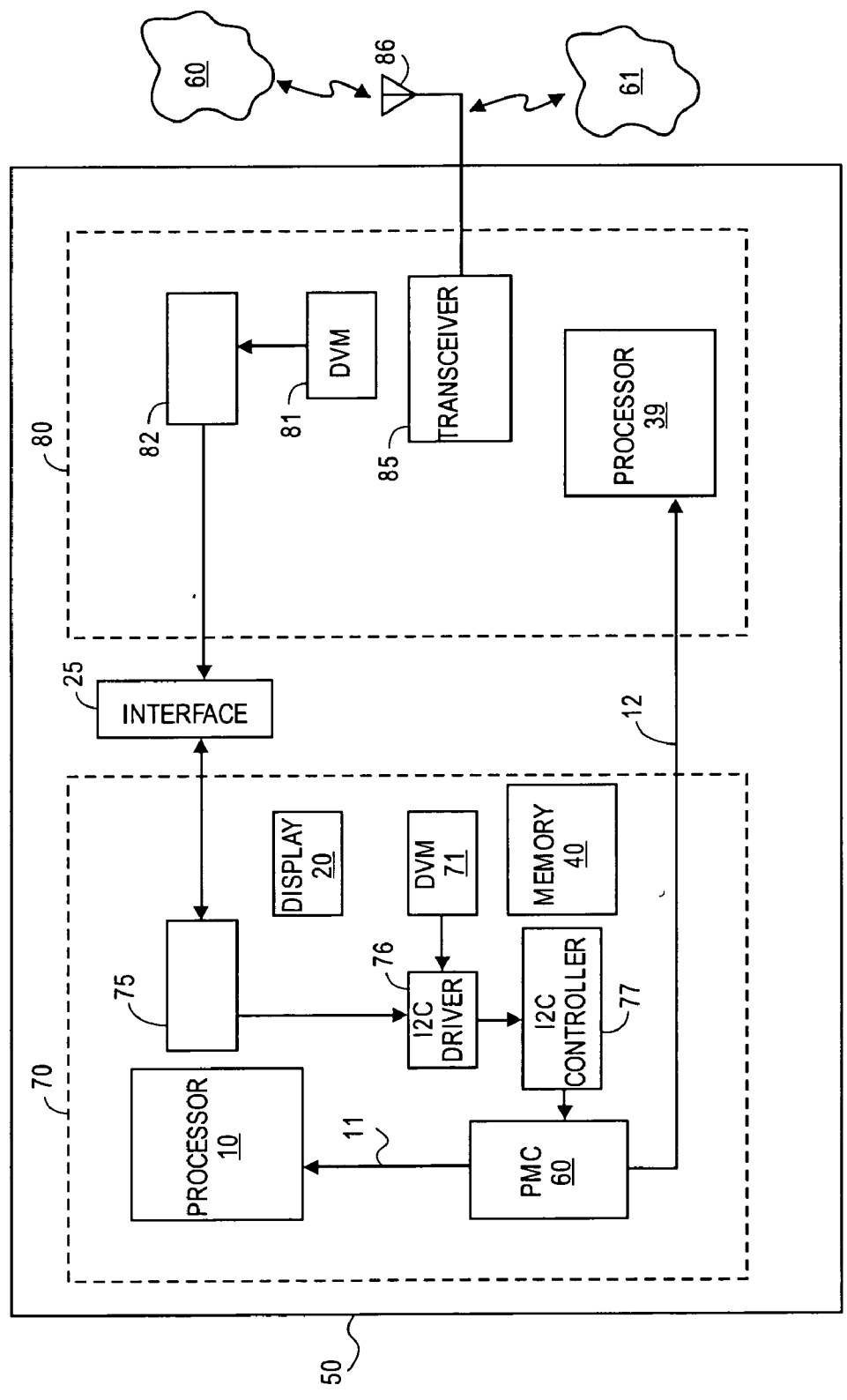

PORTABLE COMMUNICATION DEVICE HAVING DYNAMIC POWER MANAGEMENT CONTROL AND METHOD THEREFOR

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawing in which:

the FIGURE is a schematic representation of a portion of portable communication device in accordance with an embodiment of the present invention.

It will be appreciated that for simplicity and clarity of illustration, elements illustrated in the FIGURE have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable computing or communication device 50 such as a mobile communication device (e.g., cell phone), a two-way radio communication system, a one-way pager, a two-way pager, a personal communication system (PCS), a personal digital assistant (PDA), a portable computer, or the like. Other embodiments may include, for example, any combination of laptop and portable commuters with wireless communication capability, web tablets, wireless headsets, instant messaging devices, MP3 players, digital cameras, and other devices that may receive and/or transmit information wirelessly. Although it should be understood that the scope and application of the present invention is in no way limited to these examples. Other embodiments of the present invention may include other computing systems that may or may not be portable or even involve communication systems such as, for example, desktop or portable computers, servers, network switching equipment, etc.

In this particular embodiment portable communication device 50 may include an application subsystem 70 and a communication subsystem 80 that are coupled together by an interface 25. Although the scope of the present invention is not limited in this respect, application subsystem 70 may be used to provide features and capabilities that are visible or used by a user such as, for example, email, calendaring, audio, video, gaming, etc. Communication subsystem 80 may be used to provide wireless and/or wired communication with other networks 60–61 such as, for example, cellular networks, wireless local area networks, etc.

An interface 25 may be used to provide communication or information between application subsystem 70 and communication subsystem 80. Although the scope of the present invention is not limited in this respect, interface 25 may comprise serial and/or parallel buses to share information along with control signal lines to be used to provide handshaking between application subsystem 70 and communication subsystem 80.

However, it should be understood that the use of interface 25 should be considered optional. In addition, the scope of the present invention is not limited so as to require both application subsystem 70 and communication subsystem 80. In alternative embodiments, a portable communication device may have just one or the other. Further, yet other embodiments may have one processor that provides the capabilities of both.

In this particular embodiment, application subsystem 70 may include a processor 10 that may execute instructions such as instructions stored in a memory 40. Processor 10 may be one of a variety of integrated circuits such as, for example, a microprocessor, a central processing unit (CPU), a digital signal processor, a microcontroller, a reduced instruction set computer (RISC), a complex instruction set computer (CISC), or the like, although the scope of the present invention is not limited by the particular design or functionality performed by processor 10. In addition, in some alternative embodiments, application subsystem 70 may comprise multiple processors that may be of the same or different type.

Portable communication device 50 may also comprise memory 40 that may comprise any variety of volatile or non-volatile memory such as any of the types of storage media recited earlier, although this list is certainly not meant to be exhaustive and the scope of the present invention is not limited in this respect. Memory 40 may comprise persistent memory to be used to store sets of instructions such as instructions associated with an application program, an operating system program, a communication protocol program, etc. For example, the instructions stored in memory 40 may be used to perform wireless communications, provide security functionality for portable communication device 50, user functionality such as calendaring, email, internet browsing, etc.

Application subsystem 70 may also comprise a display 20 to provide information to a user. Alternatively or in addition, application subsystem 70 may include other components such as input/output devices, audio outputs, etc. However it should be understood that the scope of the present invention is not limited so as to require any particular combination of components shown in FIG. 1.

Communication subsystem 80 may include a base band processor 39, such as one of the types described above and a transceiver 85 to provide access to other devices, service, networks, etc that may be used to allow portable communication device 50 to communicate with other networks through either a wired or wireless link. As shown, transceiver 85 may use antennae 86 to wirelessly communicate with networks 60–61.

Although the scope of the present invention is not limited in this respect, communication transceiver 85 may employ a variety of wireless communication protocols such as cellular (e.g. Code Division Multiple Access (CDMA) cellular radio-telephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like). In addition, portable communication device 50 may also include multiple transceivers that use different communication protocols.

In addition, transceiver 85 may use other protocols such as wireless local area network (WLAN), wide area network (WAN), or local area network (LAN) protocols such as the Industrial Electrical and Electronics Engineers (IEEE) 802.11 standard, Bluetooth™, infrared, etc. (Bluetooth is a registered trademark of the Bluetooth Special Interest Group).

It should be understood that the scope of the present invention is not limited by the types of, the number of, or the frequency of the communication protocols that may be used by portable communication device 50. Furthermore, alternative embodiments may have more than two communication modules (either wired or wireless) and communication modules need not have separate antennae, and some or all may share a common antenna. It should also be understood that communication subsystem 80 may include other optional components such as, for example, a vocoder to encode voice data, etc.

Portable communication device 50 may also include an integrated circuit that provides a power management controller (PMC) 60. As shown in the FIGURE, PMC 60 may be a hardware module that resides in application subsystem 70. However, it should be understood that the scope of the present invention is not limited in this respect. In alternative embodiments, PMC 60 may be integrated into other components of application subsystem 70 such as, for example, processor 10. In yet other embodiments, PMC 60 may be part of communication subsystem 80 or interface 25. Further, it should be understood that PMC 60 may be provided with any combination of both hardware and software and may involved the execution of instructions by a processor or state machine.

Although the scope of the present invention is not limited in this respect, PMC 60 may adjust or vary the operation of processors in order to reduce the power consumption of portable communication device 50. For example, PMC 60 may send instructions, commands, and/or signals to one or more processors, which, in turn, may result in the processors altering one or more operational characteristics of the processors. In particular, PMC 60 may be able to vary the operational or clocking frequency of the processors, the power supply voltage potential of all or a portion of the circuitry of the processors, the number of wait states to be employed by the processors, or any other operational characteristic that otherwise alters the power consumption of the processors.

Although the scope of the present invention is not limited in this respect, PMC 60 may be directly connected to processor 10 of application subsystem 70 and to processor 39 of communication subsystem 80 as shown in the FIGURE. In other words, PMC 60 may be able to directly control operation characteristics of processor 39 without having to send information, commands, or signal via interface 25. As shown, in this particular embodiment, PMC 60 may have dedicated communication paths to processors 10 and 39 (indicated in the FIGURE with arrows 11 and 12, respectively). This, in turn, may permit PMC 60 to vary the operational characteristics of one processor while leaving the other substantially unchanged, although the scope of the present invention is not limited in this respect. For example, PMC 60 may be able to increase the clocking frequency of processor 10 independently, and thus, leave the clocking frequency of processor 39 unchanged. Alternatively, PMC 60 may increase one or more operational characteristics (e.g. power supply potential) of one processor while reduce the same characteristic(s) of the other processor.

It should be understood that PMC 60 may vary the operational characteristics for a variety of reasons and during a variety of situations and that the scope of the present invention is not limited to any one in particular. For example, PMC 60 may reduce the power consumption of processor 39 if portable communication device 50 is not in communication with a network, base station, access point, etc. (i.e. portable communication device is in an idle or standby mode).

Alternatively or additionally, PMC 60 may increase the frequency and/or power supply voltage potential to processor 10 in order to increase its processing capability. For example, the MIPS (million instructions per second) rate of processor 39 may be increased if additional programs and/or applications are being executed by processor 10. In yet other embodiments, PMC 60 may reduce the power consumption of processor 39 in an attempt to extend the battery life of portable communication device 50. In other embodiments, the operational characteristics may be altered by PMC 60 in response to other changes in the hardware or software of portable communication device 50.

Referring to the FIGURE, an example of how PMC 60 may vary the operation of processors 10 and 39 is provided. Although the scope of the present invention is not limited in this respect, application subsystem 70 and communication subsystem 80 may include a dynamic voltage management (DVM) controller 71 and 81, respectively that may include any combination of hardware and software. For example, DVM 71 may be provided, at least in part, by instructions executed by processor 10 or another processor, state machine, etc. DVM's 71 and 81 may monitor the operation of application subsystem 70 and communication subsystem 80 to determine what changes, if any, should be made to the operation of processors 10 and 39. Thus, DVM's 71 and/or 81 may indicate to PMC 60 how to adjust the power consumption of processors 10 and 39, respectively.

In one particular example, although the scope of the present invention is not limited in this respect, DVM 71 may recognize that the demand on processor 10 has increased and that an increase in frequency or power supply voltage potential is appropriate so that processor 10 may execute instructions in a manner satisfactory to other components of portable communication device 50 or to the user.

Similarly, DVM 81 may monitor the operation of communication subsystem 80 and prompt changes to the operation of processor 39 as appropriate. For example, DVM 81 may call for processor 39 to be placed into a standby or low power state if portable communication device is not communicating or in an area where is it receiving wireless communications, although the scope of the present invention is not limited to this particular example.

It should be understood that the scope of the present invention is not limited by the particular implementation for DVM's 71 and 81, nor by the method by which changes in the operation of processors 10 and 39 is determined. Furthermore, DVM's 71 and 81 may call for adjustments in the operation of processor 10 and 39 either dynamically, periodically, with the changes in the software or hardware of portable communication device 50, etc.

As indicated in the FIGURE, in this particular embodiment instructions, commands, or signals from DVM 81 may be provided to PMC 60 through interface 25. Although the scope of the present invention is not limited in this respect, the information from DVM 81 may be provided to an integrated circuit or interface controller 82 using one of a variety of bus or transfer protocols. For example, DVM 81 may provide instructions or commands to alter the operation of processor 39 using an inter-integrated circuit (I2C) compliant message. Although it should be understood that the scope of the present invention is not limited by the particular protocol used to communicate between DVM 81 an application subsystem 70. Thus, the instructions or signals to adjust the operational characteristics of processor 39 may be provided to application subsystem 70 from DVM 81 via interface 25.

Application subsystem 70 may include an interface controller 75 that may receive the control signals from interface 25 and convert them into I2C compliant messages so they may be provided to an I2C driver 76. I2C driver 76 may take the messages from DVM 60 and translate them to provide the appropriate signals to I2C controller 77. I2C controller 77 may, in turn, provide the appropriate controls and/or signals to PMC 60. It should be noted that I2C driver 76 may also receive commands from DVM 71 that may result in changes to the operational characteristics of processor 10. Although it should be understood that the scope of the present invention is not limited to application where I2C driver receives instructions from multiple DVM's. In alternative embodiments, each of the processor may have its own dedicate DVM and I2C driver or any other combination of shared resources.

I2C controller 77 may then provide PMC 60 with the appropriate commands, instructions, or signals to direct PMC 60 to make the appropriate changes in the operation of the processor(s) couple to PMC 60. Thus continuing with the particular embodiment shown in the FIGURE, I2C control 77 may direct PMC 60 to reduce the frequency or power supply voltage potential of processor 39.

It should be understood that the scope of the present invention is not limited to the particular embodiment shown in the FIGURE. For example, DVM 81 may use communication paths other than via interface 25 to inform PMC 60 of what changes should be made to the operation of processor 39. In alternative embodiments, DVM 81 may use a direct connection, an interrupt process, etc. as the scope of the present invention is not limited by how the information is provided to PMC 60. Accordingly, the use of controller 75 and 82, I2C drivers 76 and I2C controller 77 should be considered optional.

In addition, in the embodiment shown in the FIGURE, PMC 60 is directly connected to processors 10 and 39. In alternative embodiments, PMC 60 may send signals indirectly such as via interface 25. It should also be understood that the scope of the present invention is not limited such to embodiments where PMC 60 is part of application subsystem 70. In other embodiment, PMC 60 may be part of communication subsystem 80 or be external to both application subsystem 70 and communication subsystem 80. It should also be understood that PMC 60 need not be directly connected to processors 10 and 39. In alternative embodiments, PMC 60 may only vary the operation of one processor or of three or more processors. Furthermore, the scope of the present invention is not limited so as to require PMC 60 to alter the operation of processors in different subsystems. In other embodiments, PMC 60 may alter the operation of processors in only one or the other subsystem.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A portable communication device comprising:
an application subsystem having a first processor and a first dynamic power management policy manager adapted to monitor operation of the application subsystem;
a communication subsystem having a second processor and a second dynamic power management policy manager adapted to monitor operation of the communication subsystem; and
a power management circuit adapted to adjust power consumption of both the first processor and the second processor,
wherein the first and second dynamic power management policy managers are adapted to indicate to the power management circuit how to adjust power consumption.

2. The portable coniinunication device of claim 1, wherein the power management circuit is adapted to reduce a clocking frequency of the first processor and the second processor.

3. The portable communication device of claim 1, wherein the power management circuit is adapted to reduce a power supply voltage potential of the first processor and the second processor.

4. The portable communication device of claim 1, further comprising a third processor, wherein the power management circuit is further adapted to adjust power consumption of the third processor.

5. The portable communication device of claim 1, further comprising an interface to couple the application subsystem to the communication subsystem.

6. The portable communication device of claim 5, wherein the power management circuit is able to receive information from the communication subsystem via the interface.

7. The portable communication device of claim 6, wherein the power management circuit is able to receive an inter-integrated circuit (I2C) compliant message from the communication subsystem via the interface.

8. The portable communication device of claim 1, wherein the first dynamic power management policy manager is provided, at least in part, by instructions executed by the first processor.

9. The portable communication device of claim 1, wherein the power management circuit is adapted to provide control signals directly to the first processor and the second processor.

10. The portable coniniunication device of claim 1, wherein the second dynamic power management policy manager is provided, at least in part, by instructions executed by the second processor.

11. An apparatus comprising:
a transceiver;
a first processor coupled to the transceiver;
a first dynamic power management policy manager adapted to monitor operation relating to power consumption by the first processor;
a second processor;
a second dynamic power management policy manager adapted to monitor operation relating to power consumption by the second processor; and
a power management controller adapted to adjust an operational characteristic of the first processor in response to a request from the first dynamic power management policy manager and to adjust an operational characteristic of the second processor in response to a request from the second dynamic power management policy manager.

12. The apparatus of claim 11, further comprising an interface to couple the first processor to the second processor.

13. The apparatus of claim 12, further comprising an application subsystem that includes the second processor.

14. The apparatus of claim 13, further comprising a communication subsystem that includes the first processor.

15. The apparatus of claim 13, further comprising an inter-integrated circuit controller to provide the power management controller with instructions to adjust the operational characteristic of the first processor and the second processor in response to requests from the first and second dynamic power management policy managers.

16. The apparatus of claim 11, wherein the power management controller is adapted to adjust one of a frequency or a power supply voltage potential of the first processor and the second processor.

17. The apparatus of claim 11, wherein the power management controller is further adapted to adjust an operational characteristic of the first processor without altering operation of the second processor.

18. A method comprising:
monitoring operation relating to power consumption by a first processor with a first dynamic power management policy manager;
monitoring operation relating to power consumption by a second processor with a second dynamic power management policy manager; and
varying with a power management controller an operational characteristic of the first processor in response to a request from the first dynamic power management policy manager and an operational characteristic of the second processor in response to a request from the second dynamic power management policy manager, wherein the power management controller is adapted to vary an operational characteristic of the first processor independently of the second processor.

19. The method of claim 18, further comprising varying a frequency of the first processor while leaving operation of the second processor substantially unchanged.

20. The method of claim 18, wherein the varying comprises increasing a frequency of the first processor while decreasing a frequency of the second processor.

21. The method of claim 18, further comprising varying a power supply voltage potential of the first processor while leaving operation of the second processor substantially unchanged.

22. The method of claim 18, further comprising sending a request from the first dynamic power management policy manager in a communication subsystem via an interface to the power management controller.

23. The method of claim 22, wherein the varying comprises varying an operational characteristic of the first processor in the communication subsystem.

* * * * *